Oct. 29, 1968  L. M. SCHOMBURG ET AL  3,407,652
DOUBLE ACTING FLUID LOAD CELL
Filed June 24, 1966
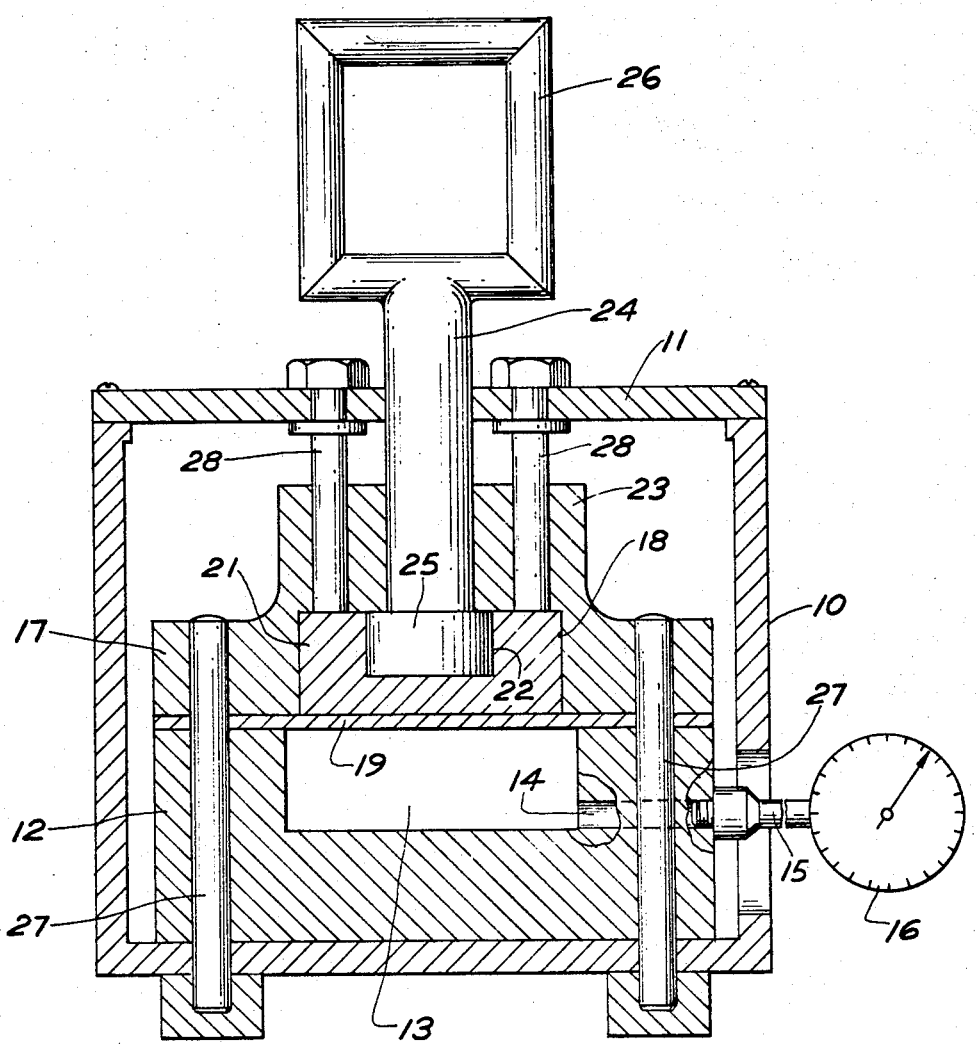
INVENTOR.
LOUIS M. SCHOMBURG &
BY GEORGE A. DVORAK
*Bair, Freeman*
*& Molinare*
ATTORNEYS

United States Patent Office 3,407,652
Patented Oct. 29, 1968

3,407,652
DOUBLE ACTING FLUID LOAD CELL
Louis M. Schomburg, Arlington Heights, and George A. Dvorak, Westchester, Ill., assignors to Sun Electric Corporation, a corporation of Delaware
Filed June 24, 1966, Ser. No. 560,289
4 Claims. (Cl. 73—141)

ABSTRACT OF THE DISCLOSURE

A double acting fluid load cell which is operable under either tension or compression forces. The force is transmitted through a transmitting rod to the interior of a hollow body containing a fluid and a pressure gauge communicates with the fluid to indicate the degree of force exerted. When a compression force is exerted on the transmitting rod, the body is held fixed and a piston attached to the rod is moved in the direction of the force, pressurizing the fluid. When a tension force is exerted on the rod, the piston is held fixed by stationary pins extending into the body and the body is movably drawn by the transmitting rod in the direction of the force to pressurize the fluid.

Background of the invention

This invention relates to a double acting fluid load cell and more particularly to a hydraulic load cell capable of producing a pressure change proportional to an applied force regardless of whether the force is applied to the load cell in tension or compression.

There are many applications in which it is desirable to measure a force and in which it cannot always be ascertained in advance whether the force will act in tension or compression on the measuring device. One example is in the measurement of torque exerted by cranking motors for internal combustion engines. The normal method of measuring the torque of such motors has been to attach an arm to the motor shaft and connect the end of the arm to a measuring device, such as a scale or load cell. When the motor turns in a direction to exert a downward pressure on the measuring device, a proper measurement of the motor torque can be obtained. However, if the motor turns in a direction to exert an upward force on the measuring device, the arm will swing upwardly and will tend to lift the measuring device and swing it around the motor shaft. Under these conditions, not only is there a failure to measure the motor torque but an extremely hazardous situation is created.

It is accordingly one of the objects of the present invention to provide a double acting fluid load cell which will accurately measure an applied force in either tension or compression without requiring any change in the load cell or in its physical location or attachment to the test apparatus.

Another object is to provide a double acting fluid load cell in which a displacer element such as a piston is moved in one direction in a fluid displacer chamber by a force exerting rod when the rod is moved in one direction and which is held against movement while the rod moves the chamber in the other direction upon a reverse application of the applied force.

Summary of the invention

According to a feature of the invention, a chamber defining body is held against movement in one direction but is free to move in the other direction. The body contains a movable piston whose outer end is engaged by both a force transmitting rod and one or more stop pins. When the force transmitting rod moves toward the piston, it moves the piston in the chamber to displace fluid therein. When the rod moves in the opposite direction, a part thereon engages the body to move it with the rod while the stop pins hold the piston against movement thereby also displacing the fluid in the chamber. In this way the same measurement is obtained regardless of whether the force applied to the load cell is in tension or compression.

Brief description of the drawing

The above and other objects and features of the invention will be more readily apparent from the following description when read in connection with the accompanying drawing in which the single figure is a cross-sectional view of a double acting load cell embodying the invention.

Description of the preferred embodiment

As shown in the drawing, the load cell comprises an outer housing formed of a cup-shaped bottom portion 10 closed by a top removable cover 11 and which is adapted to be fixedly mounted at a desired testing location. While no specific mounting means is shown, it will be understood that the housing is to be fastened down so that it cannot move upwardly.

The housing loosely contains a chamber defining body formed of a lower cup-shaped portion 12 having a flat bottom which normally rests on the bottom of the housing. The body 12 is formed with a cavity 13 in its upper surface which defines a fluid receiving chamber as will be more fully apparent hereinafter. The fluid receiving chamber is connected through a passage 14 in the lower body portion and through a suitable hose or pipe 15 to a pressure gauge 16 which will sense the pressure of the fluid in the cavity 13. The gauge may be calibrated in any desirable units, such as inch pounds when torque is to be measured. The cavity 13 and the conduit 14 and hose 15 are completely filled with a hydraulic fluid so that any pressure applied to the fluid in the cavity 13 will be indicated accurately on the pressure gauge 16.

The body is completed by an upper portion 17 complementary to the lower portion 12 and which is secured thereto in face-to-face relationship as shown. The upper body portion 17 is formed with a cylindrical recess 18 coaxial with the recess 13 and preferably of smaller diameter than the recess 13 as shown. Preferably, a flexible diaphragm 19 is secured between the body portions 12 and 17 to seal the fluid in the cavity 13 against any possible leakage and to be deflectable to apply pressure to the fluid in the cavity 13.

The diaphragm is adapted to be deflected by a displacer 21 which is shown as a piston fitting slidably in the recess 18 in the upper body portion. When the diaphragm 19 is employed the piston need not have a sealing fit in the recess 18, although it will be apparent that if the diaphragm were omitted the piston could be provided with suitable seals to prevent leakage of fluid past it. The piston is formed in its upper surface with a cavity 22 which is preferably cylindrical in shape for a purpose to appear more fully hereinafter. The upper body section terminates in a neck 23 having a vertical bore therethrough which is of smaller diameter than the recess 22 in the piston as shown. The piston 21 is adapted to be moved in a downward direction by a force transmitting rod 24 which extends through the top of the housing and through the bore in the neck 23 of the upper body section. At its lower end the force transmitting rod 24 is formed with an enlarged cylindrical collar portion 25 which fits into the recess 22 in the upper surface of the piston. At its upper end the force transmitting rod 24 carries a yoke 26 by which it may be connected to an arm or similar force transmitting device which may transmit either an upward or a downward force thereto.

The entire body formed by the sections 12 and 17 is held against downward movement in the housing by engagement with the bottom thereof but is free to move upwardly therein. Preferably, guide pins 27 are provided carried by the housing lower wall and extending slidably through openings in the body to guide the body for vertical movement.

In order to hold the piston against upward movement when the body is moved upwardly, one or more stop pins 28 are provided which are rigidly secured to the housing cover 11 and which extend slidably through openings in the top of the body to engage the upper surface of the piston. In use of the unit as so far described, when a downward force is applied to the yoke 26 the force transmitting rod 24 will move downwardly and will cause the piston 21 to move downwardly. This will tend to deflect the diaphragm 19 creating a pressure on the fluid in the chamber 13 proportional to the applied force. This pressure will be indicated on the gauge 16 which will accurately indicate the value of the applied force.

When an upward force is applied to the yoke 26 the rod 24 will tend to rise and the collar 25 thereon will engage the body upper section and tend to raise the body with the rod. However, the stop pins 28 will hold the piston against upward movement so that the piston will again be moved downwardly in the chamber in the body to create a pressure on the fluid in the recess 13 proportional to the applied force. It will thus be apparent that the load cell of the present invention is capable of measuring a force applied in either tension or compression without any change or adjustment in the apparatus.

While one embodiment of the invention has been shown and described in detail, it will be understood that this is illustrative only and is not to be taken as a definition of the scope of the invention, reference being had for this purpose to the appended claims.

What is claimed is:

1. A double acting fluid load cell comprising a hollow body supported against movement in one direction but movable in the opposite direction, the body defining a chamber adapted to contain a fluid, a pressure sensing device connected to the chamber, fluid displacer means movable in the chamber in one direction to place the fluid therein under pressure, a force transmitting rod extending movably into the chamber to move the displacer in said one direction therein when the rod moves in said one direction, means on the rod to engage and move the body when the rod is moved in the opposite direction, and stop pin means extending slidably into the chamber and engaging the displacer to prevent movement thereof with the body and the rod when the body is moved in said opposite direction thereby to cause the displacer to move in said one direction in the chamber.

2. The load cell of claim 1 in which the displacer means comprises a piston slidable in the chamber and normally seated against one end of the chamber and the rod and pin means engage the end of the piston at said one end of the chamber.

3. The load cell of claim 1 in which the displacer means comprises a flexible diaphragm dividing the chamber into a fluid containing space and a piston space and a piston slidable in the piston space to engage and deflect the diaphragm and in which the rod and the stop pins engage the end of the piston remote from the diaphragm.

4. A double acting fluid load cell comprising a fixed housing, a hollow body in the housing normally resting on the bottom thereof but movable upward therein, the body defining a chamber adapted to contain a fluid, a pressure sensing device connected to the chamber, a piston in the chamber normally seated against the upper end thereof and movable downwardly to place the fluid in the chamber under pressure, a force transmitting rod extending slidably through the top of the body into the upper end of the chamber and engaging the upper end of the piston, interengaging parts on the rod and the body to move the body upwardly with the rod when the rod moves upwardly, and stop pins carried by the housing and extending slidably through the top of the body and engaging the upper end of the piston to prevent upward movement thereof when the rod moves upwardly.

References Cited

UNITED STATES PATENTS 3,033,495 5/1962 Sikora _____ 73—141 XR
3,285,070 11/1966 McDonough _____ 73—141 XR RICHARD C. QUEISSER, *Primary Examiner.*

CHARLES A. RUEHL, *Assistant Examiner.*